United States Patent
Bestgen et al.

(10) Patent No.: US 11,766,895 B2
(45) Date of Patent: Sep. 26, 2023

(54) TIRE WITH CARCASS REINFORCERS, HOOPING REINFORCERS, AND WORKING REINFORCERS CONSTITUTING A TRIANGULATION

(71) Applicant: Compagnie Generale Des Etablissements Michelin, Clermont-Ferrand (FR)

(72) Inventors: Luc Bestgen, Clermont-Ferrand Cedex 9 (FR); Christophe Le Clerc, Clermont-Ferrand Cedex 9 (FR); Jacky Pineau, Clermont-Ferrand Cedex 9 (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1343 days.

(21) Appl. No.: 15/566,598

(22) PCT Filed: Apr. 11, 2016

(86) PCT No.: PCT/EP2016/057913
§ 371 (c)(1),
(2) Date: Oct. 13, 2017

(87) PCT Pub. No.: WO2016/166057
PCT Pub. Date: Oct. 20, 2016

(65) Prior Publication Data
US 2018/0093532 A1    Apr. 5, 2018

(30) Foreign Application Priority Data
Apr. 17, 2015  (FR) .................................. 1553418

(51) Int. Cl.
  *B60C 9/07*   (2006.01)
  *B60C 9/20*   (2006.01)
  *B60C 9/22*   (2006.01)

(52) U.S. Cl.
  CPC .............. *B60C 9/07* (2013.01); *B60C 9/2009* (2013.01); *B60C 9/22* (2013.01);
  (Continued)

(58) Field of Classification Search
  CPC .... B60C 9/07; B60C 9/005; B60C 2009/0491
  (Continued)

(56) References Cited

U.S. PATENT DOCUMENTS 2,930,425 A * 3/1960 Lugli et al. ............... B60C 9/07
                                                   152/562 X
3,327,753 A * 6/1967 Travers .................... B60C 9/07
                                                   152/562 X
(Continued)

FOREIGN PATENT DOCUMENTS

CN     102762390     10/2012
EP     2 537 686     12/2012
(Continued)

OTHER PUBLICATIONS

Pneumatic Tire, Alan Neville Gent and Joseph D. Walter, University of Akron Department of Mechanical Engineering Paper 854, 2006, online publication, p. 87.*

*Primary Examiner* — Adrienne C. Johnstone
(74) *Attorney, Agent, or Firm* — Cozen O'Connor

(57) ABSTRACT

A passenger vehicle tire having hooping layer (71) that has a force at break FR per mm of axial width of the hooping layer at least equal to 35 daN/mm and has a secant extension modulus MA at least equal to 250 daN/mm, for an applied force F equal to 15% of FR. Working reinforcement (6) comprises a single working layer (61) the working reinforc-
(Continued)

ers of which form, with the circumferential direction (YY'), an angle $A_T$ at least equal to 30° and at most equal to 50°. The carcass reinforcers of the at least one carcass layer (81) form, with the circumferential direction (YY') and in the equatorial plane (XZ), an angle $A_{C2}$ at least equal to 55° and at most equal to 80° and having an orientation opposite of that of angle $A_T$ of the working reinforcers so that the carcass reinforcers and the working reinforcers constitute a triangulation.

12 Claims, 4 Drawing Sheets

(52) U.S. Cl.
CPC ............ *B60C 2009/2019* (2013.01); *B60C 2009/2228* (2013.01); *B60C 2009/2233* (2013.01); *B60C 2009/2261* (2013.01); *B60C 2009/2276* (2013.01)

(58) Field of Classification Search
USPC .......................................... 152/562
See application file for complete search history.

(56) References Cited

U.S. PATENT DOCUMENTS

| 4,155,394 | A | * | 5/1979 | Shepherd | ............... B60C 9/005 |
| | | | | | 152/527 |
| 4,286,645 | A | * | 9/1981 | Boileau | ..................... B60C 9/07 |
| 4,310,043 | A | | 1/1982 | Inoue | |
| 6,821,369 | B2 | * | 11/2004 | Corner | |
| 2012/0305158 | A1 | | 12/2012 | Hayashi | |

FOREIGN PATENT DOCUMENTS

| EP | 2 682 281 | 1/2014 |
| JP | 04-123904 | 4/1992 |
| JP | 2001 206010 | 7/2001 |
| JP | 2011 148418 | 8/2011 |

\* cited by examiner

US 11,766,895 B2

TIRE WITH CARCASS REINFORCERS, HOOPING REINFORCERS, AND WORKING REINFORCERS CONSTITUTING A TRIANGULATION

RELATED APPLICATIONS

This is a U.S. National Phase Application under 35 USC 371 of International Application PCT/EP2016/057913 filed on Apr. 11, 2016.

This application claims the priority of French application no. 1553418 filed Apr. 17, 2015.

FIELD OF THE INVENTION

The invention is related to a tire for a passenger vehicle, commonly referred to as a passenger vehicle tire, and, more particularly, the reinforcement thereof.

BACKGROUND OF THE INVENTION

Since a tire is a toric structure the axis of revolution of which is the axis of rotation of the tire, the terminologies used for the present invention are as defined hereinbelow:
"axial direction": direction parallel to the axis of rotation of the tire,
"radial direction": direction perpendicular to the axis of rotation of the tire,
"circumferential direction": direction perpendicular to a radial plane containing the axis of rotation of the tire,
"radial plane": plane containing the axis of rotation of the tire,
"equatorial plane": plane perpendicular to the axis of rotation and passing through the middle of the tread.

A tire usually comprises a tread intended to come into contact with the ground and connected, at its axial ends, radially towards the inside, via two sidewalls, to two beads intended to come into contact with a rim. The radial distance between the radially outermost point of the tread and the straight line passing through the radially innermost points of the beads, with the tire mounted on its rim, is referred to as the height H of the tire.

A radial tire further comprises a reinforcement comprising, radially from the outside towards the inside, at least one working reinforcement and one carcass reinforcement.

The working reinforcement, radially on the inside of the tread, comprises at least one working layer comprising working reinforcers coated in an elastomeric material, the said working reinforcers forming, with the circumferential direction, an angle at least equal to 10°. Usually, the working reinforcement of a passenger vehicle tire comprises two working layers, the respective working reinforcers of which are crossed from one working layer to the next, so as to create a triangulation. Generally, the working reinforcers, for a passenger vehicle tire, are made of a metallic material, usually steel, and are formed of a collection of threads, referred to as a cord, or of a single thread.

The carcass reinforcement, radially on the inside of the working reinforcement, connects the two beads of the tire, generally by being wrapped, within each bead, around a circumferential reinforcing element or bead wire, and comprises at least one carcass layer comprising carcass reinforcers coated in an elastomeric material. In the case of a passenger vehicle tire, the carcass reinforcement generally comprises a single carcass layer. In the most frequently encountered case of a radial carcass reinforcement, the carcass reinforcers form, with the circumferential direction, at every point on the carcass layer, an angle at least equal to 85°. Generally, the carcass reinforcers, for a passenger vehicle tire, are made of a textile material such as, by way of nonexhaustive examples, an aliphatic polyamide or nylon, an aromatic polyamide or aramid, a polyester such as a polyethylene terephthalate (PET), a textile material comprising cellulose fibres such as rayon.

Often, the reinforcement also comprises a hoop reinforcement. A hoop reinforcement is adjacent to the working reinforcement, namely radially on the outside of the working reinforcement or radially on the inside of the working reinforcement. The hoop reinforcement is generally radially on the outside of the carcass reinforcement. It comprises at least one hooping layer, and usually a single hooping layer. A hooping layer comprises hoop reinforcers, coated in an elastomeric material and forming, with the circumferential direction, an angle at most equal to 5°. The hoop reinforcers, for a passenger vehicle tire, may be made either of a textile material or of a metallic material.

The assembly formed by the working reinforcement and the hoop reinforcement constitutes the crown reinforcement of the tire.

While it is in use, a passenger vehicle tire may run over foreign bodies that pierce its tread and are liable to partially or fully rupture the working layers. This is chiefly due to the high stiffness, particularly radial stiffness, of the working reinforcement. For a conventional tire of the prior art, the high deformations imposed by the piercing by such objects are essentially supported by the working reinforcement, but not by the carcass reinforcement.

U.S. Pat. No. 4,310,043 already discloses a radial tire intended for vehicles of the heavy duty type, having a high resistance to bursting under the effect of shocks which may occur when passing over a stone. Such a tire notably comprises a carcass reinforcement, not having excessive mechanical strength and comprising at least one carcass layer which may comprise textile reinforcers, and a working reinforcement, radially on the outside of the carcass reinforcement, comprising three working layers the two radially outermost ones of which comprise metal reinforcers forming, with respect to the circumferential direction, an angle of between 15° and 25°.

SUMMARY OF THE INVENTION

One object of the invention is to provide a passenger vehicle tire that has good resistance to the penetration and perforating of its crown by foreign objects liable to pierce the said crown, with a reinforcement design that is simpler and more lightweight than that of a passenger vehicle tire of the prior art.

One aspect of the invention is directed to a passenger vehicle tire comprising:
a tread intended to come into contact with the ground and connected, at its axial ends, radially towards the inside, via two sidewalls, to two beads intended to come into contact with a rim,
a working reinforcement, radially on the inside of the tread, and comprising at least one working layer comprising metal working reinforcers coated in an elastomeric material, the said working reinforcers forming, with a circumferential direction of the tire, an angle $A_T$ at least equal to 10°,
a hoop reinforcement, radially on the inside of the tread, and radially adjacent to the working reinforcement, and comprising a single hooping layer comprising hoop reinforcers coated in an elastomeric material, the said hoop reinforcers forming, with the circumferential direction, an angle $A_F$ at most equal to 5°, a carcass reinforcement, joining the two beads together, radially on the inside of the working reinforcement and of the hoop reinforcement, and comprising at least one carcass layer comprising textile carcass reinforcers coated in an elastomeric material, the said carcass reinforcers forming, with the circumferential direction, at least partially in the sidewalls, an angle $A_{C1}$ at least equal to 85°, the hooping layer having a force at break per mm of axial width of the hooping layer FR at least equal to 35 daN/mm, the hooping layer having a secant extension modulus MA at least equal to 250 daN/mm, for an applied force F equal to 15% of the force at break FR of the said hooping layer, the working reinforcement comprising a single working layer the working reinforcers of which form, with the circumferential direction, an angle $A_T$ at least equal to 30° and at most equal to 50°, and the carcass reinforcers of the at least one carcass layer forming, with the circumferential direction and in the equatorial plane, an angle $A_{C2}$ at least equal to 55° and at most equal to 80° and having an orientation the opposite of that of the angle $A_T$ of the working reinforcers so that the carcass reinforcers and the working reinforcers constitute a triangulation.

A tire according to the invention is characterized by a reinforcement comprising:— a hoop reinforcement, made up of a single hooping layer comprising hoop reinforcers, the hooping layer having a specified minimal force at break FR, expressed in daN per mm of axial width of the hooping layer, and a specified minimum secant extension modulus MA, for an applied force F equal to 15% of the force at break FR of the hooping layer, the secant extension modulus MA being the ratio between 15% of the force at break FR and the corresponding elongation, a working reinforcement made up of a single working layer the metal working reinforcers of which form, with the circumferential direction, an angle $A_T$ at least equal to 30° and at most equal to 50°, a carcass reinforcement, usually made up of a single carcass layer, the carcass reinforcers of which form, with the circumferential direction and in the equatorial plane, an angle $A_{C2}$ at least equal to 55° and at most equal to 80° and having an orientation the opposite of that of the angle $A_T$ of the working reinforcers so that the carcass reinforcers, the hooping reinforcers, and the working reinforcers constitute a triangulation.

The essential differences between embodiments of the invention and a passenger vehicle tire of the prior art are therefore:

a hoop reinforcement with a single hooping layer having both a higher force at break and a higher tensile stiffness, a working reinforcement with a single working layer in place of two working layers the working reinforcers of which are crossed from one layer to the other, and a carcass reinforcement with a carcass layer that is not radial in the crown portion so that the carcass reinforcers and the working reinforcers are crossed relative to one another.

The inventors have been able to observe that, surprisingly, the reinforcement according to embodiments of the invention, even though it comprises one fewer working layer by comparison with the prior art, which means to say even though it is simpler and more lightweight, guarantees better resistance to penetration by an indenting body. In this case, the triangulation between the working layer and the carcass layer, which is associated with a hooping layer that is both stronger and stiffer, allows the tire more effectively to absorb the energy of deformation imposed by the piercing object, with less degradation of the reinforcement in the crown region. More particularly, the choice of physical characteristics of the hooping layer makes it possible better to control the deformed profile of the crown of the tire and therefore avoid any excessive deformation that could lead to early damage during running.

This advantage was quantified by a perforation test referred to as a "breaking energy" test, which is a standardized static test involving measuring the energy needed to perforate a tire mounted, inflated, on its rim, using a metal cylinder referred to as polar and having a diameter equal to 19 mm, the tire being subjected to a nominal given load or weighted load (overload) A nominal load is a standardized load defined by the European Tire and Rim Technical Organisation or ETRTO standard.

As far as the carcass reinforcement is concerned, the carcass layer is substantially radial in at least part of the sidewalls, which means to say that the carcass reinforcers form, with the circumferential direction, an angle at least equal to 85°. More specifically, the portion of sidewall to which this radial orientation of the carcass layer preferably relates extends radially between the axial straight lines positioned respectively at radial distances of 3H/8 and of H/8 away from the radially outermost point of the tread of the tire.

For preference, the hooping layer has a force at break per mm of axial width of the hooping layer FR at least equal to 45 daN/mm, thereby guaranteeing the hooping layer better force at break.

More preferably still, the hooping layer has a secant extension modulus MA at least equal to 300 daN/mm, for an applied force F equal to 15% of the force at break FR of the said hooping layer, thereby guaranteeing the hooping layer greater tensile stiffness.

For preference, the hooping layer has a secant extension modulus MA at most equal to 1800 daN/mm, and more preferably at most equal to 1600 daN/mm, for an applied force F equal to 15% of the force at break FR of the said hooping layer.

Advantageously, the hooping layer has a secant extension modulus MA at most equal to 1800 daN/mm, for an applied force F equal to 15% of the force at break FR of the said hooping layer.

For preference, the hooping layer has a secant extension modulus MA at most equal to 1600 daN/mm, for an applied force F equal to 15% of the force at break FR of the said hooping layer.

With the hooping layer comprising hoop reinforcers having a diameter D and spaced one from the next by an inter-reinforcer distance L, the ratio D/L between the diameter D of a hoop reinforcer and the distance L separating two consecutive hoop reinforcers is advantageously at least equal to 1 and at most equal to 8. For a D/L ratio greater than 8, the hoop-reinforcers density far exceeds what is required in terms of the mechanical strength of the hooping layer and the quantity of interstitial elastomeric material comprised between two consecutive hoop reinforcers is correspondingly insufficient. For a D/L ratio lower than 1, the hooping layer is difficult to manufacture on industrial tooling producing wide widths.

For preference, with the hooping layer comprising hoop reinforcers having a diameter D and spaced one from the next by an inter-reinforcer distance L, the ratio D/L between the diameter D of a hoop reinforcer and the distance L separating two consecutive hoop reinforcers is at least equal to 2 and at most equal to 5. A D/L ratio comprised within this interval guarantees that there will be an optimal amount of elastomeric material present with respect to the mechanical strength of the interstitial elastomeric material, thereby giving the hooping layer satisfactory robustness.

According to a first embodiment relating to the material of the hoop reinforcers, the hoop reinforcers comprise a textile material such as an aromatic polyamide or aramid, an aliphatic polyamide or nylon, a polyester such as a polyethylene terephthalate (PET), a polyethylene naphthenate (PEN), a polyketone or a textile material comprising cellulose fibres such as rayon or lyocell. Hoop reinforcers made of textile material offer the advantages of lightness of weight and ability to withstand moisture.

According to a second embodiment relating to the material of the hoop reinforcers, the hoop reinforcers comprise a combination of at least two distinct textile materials. Hoop reinforcers comprising a combination of at least two distinct textile materials, also referred to as hybrid hoop reinforcers, have the particular feature of having a tensile curve, representing the tensile force applied to the reinforcer as a function of the elongation thereof, that may exhibit a relatively low first tensile elastic modulus at low elongations and a higher second tensile elastic modulus at high elongations, which is why such reinforcers are said to exhibit "bi-modulus" behaviour. The relatively low first tensile elastic modulus contributes to the robustness of manufacture of the tire. The higher second tensile elastic modulus provides a response to the need for the tire to have mechanical strength in service.

According to a third embodiment relating to the material of the hoop reinforcers, the hoop reinforcers comprise a metallic material, such as steel. Metal reinforcers are very competitively priced, on an industrial level, compared to textile material reinforcers having an equal level of modulus of tensile strength.

For preference, the working reinforcers of the working layer form, with the circumferential direction, an angle $A_T$ at least equal to 35° and at most equal to 45°. This range of angular values corresponds to the optimum for guaranteeing the tire sufficient cornering stiffness which is needed for the tire to behave correctly during running with bends. The cornering stiffness of a tire corresponds to the axial force that has to be applied to the tire to generate a 1° rotation about a radial direction.

More preferably still, the carcass reinforcers of the at least one carcass layer form, with the circumferential direction and in the equatorial plane (XZ), an angle $A_{C2}$ at least equal to 60° and at most equal to 70°. This range of angular values is the result of the shaping of the tire during its manufacture. The reinforcers of the carcass layer are initially radial, which means to say form an angle close to 90° with the circumferential direction. As the tire is being shaped during manufacture, namely during the transition from a cylindrical shape to a toric shape, the angle of the carcass reinforcers decreases significantly in the crown region of the tire, particularly in the vicinity of the equatorial plane.

BRIEF DESCRIPTION OF THE DRAWINGS

In what follows, embodiments of the invention are described with the aid of the attached FIGS. 1 to 5 and of the examples described in Tables 1 to 5, all given by way of illustration.

DETAILED DESCRIPTION OF THE DRAWINGS

Figure 1:
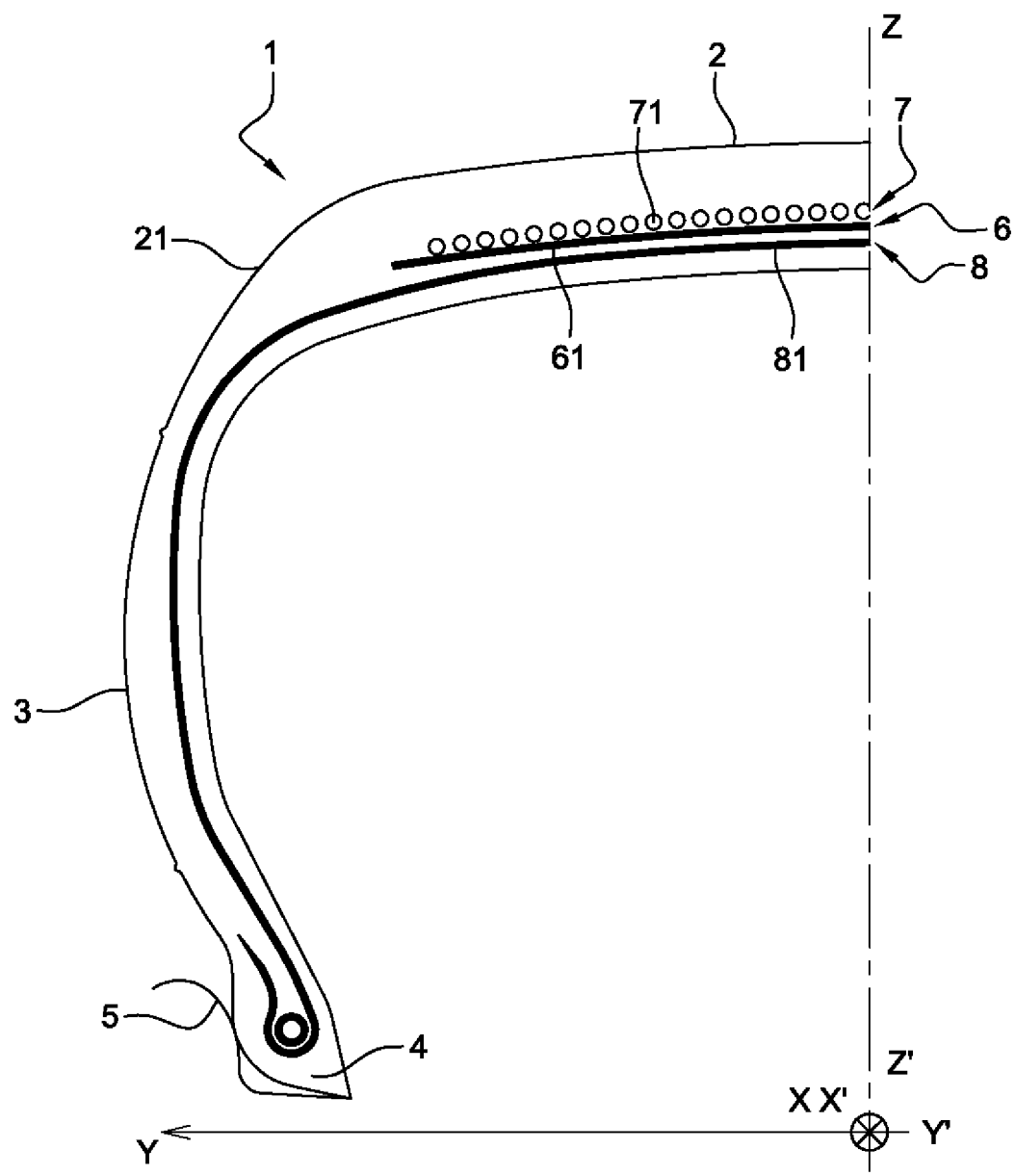

FIG. 1 schematically shows the cross section of half a tire according to the invention, in a radial plane. As FIG. 1 shows, the tire 1 according to the invention comprises a tread 2, intended to come into contact with the ground and connected, at its axial ends 21, radially towards the inside, via two sidewalls 3, to two beads 4 intended to come into contact with a rim 5. The working reinforcement 6, radially on the inside of the tread 2, comprises a working layer 61 comprising metal working reinforcers (not depicted) coated in an elastomeric material, the said working reinforcers forming, with the circumferential direction YY' of the tire, an angle $A_T$ at least equal to 10°. The hoop reinforcement 7, radially on the inside of the tread 2, and radially on the outside of the working reinforcement 6, comprises a single hooping layer 71 comprising hoop reinforcers coated in an elastomeric material, the said hoop reinforcers forming, with the circumferential direction YY', an angle $A_F$ at most equal to 5°. The carcass reinforcement 8, joining the two beads 4 together, radially on the inside of the working reinforcement 6 and of the hoop reinforcement 7, comprises at least one carcass layer 81 comprising textile carcass reinforcers (not depicted) coated in an elastomeric material, the said carcass reinforcers forming, with the circumferential direction YY', at least partially in the sidewalls 3, an angle $A_{C2}$ at least equal to 85°.

Figure 2:
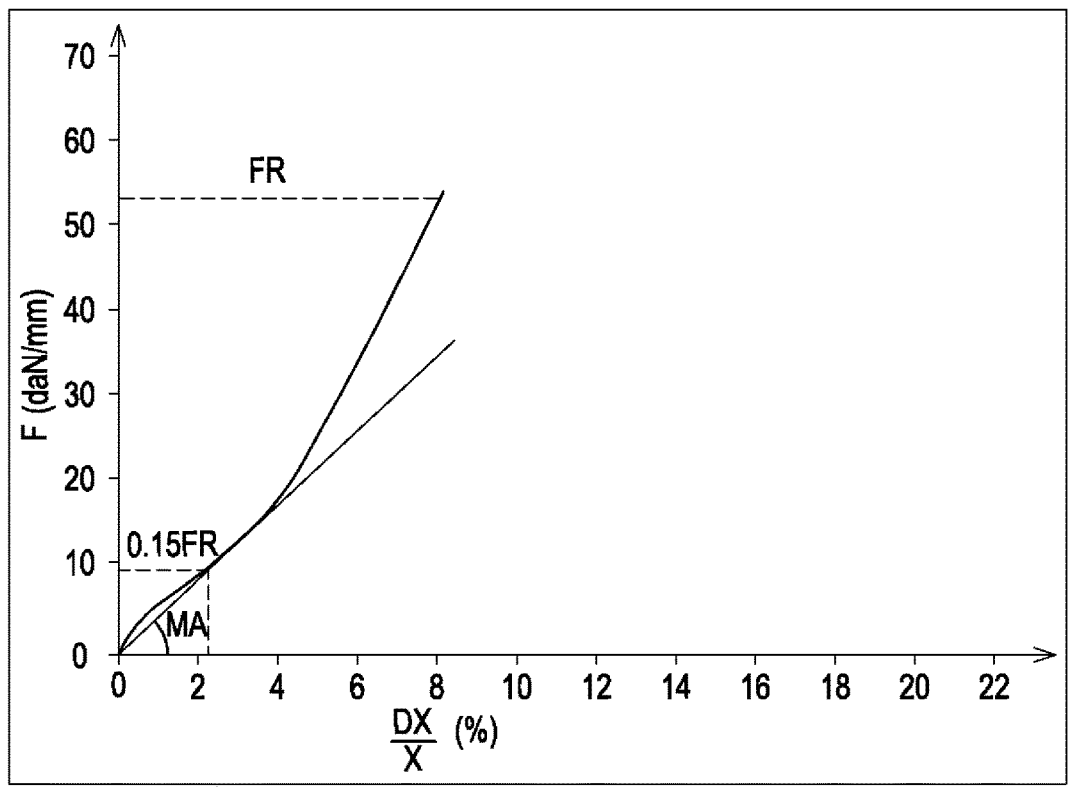

FIG. 2 shows a curve of the typical behaviour of a hooping layer, representing the tensile force F applied to the hooping layer, expressed in daN/mm, namely in daN per mm of axial width of the hooping layer, as a function of its deformation in extension DX/X. FIG. 2 in particular indicates the breaking force FR of the hooping layer and the secant extension modulus MA, measured at a force F equal to 0.15 times the breaking force FR and in a standardized manner characterizing the tensile stiffness of the hooping layer.

Figure 3:
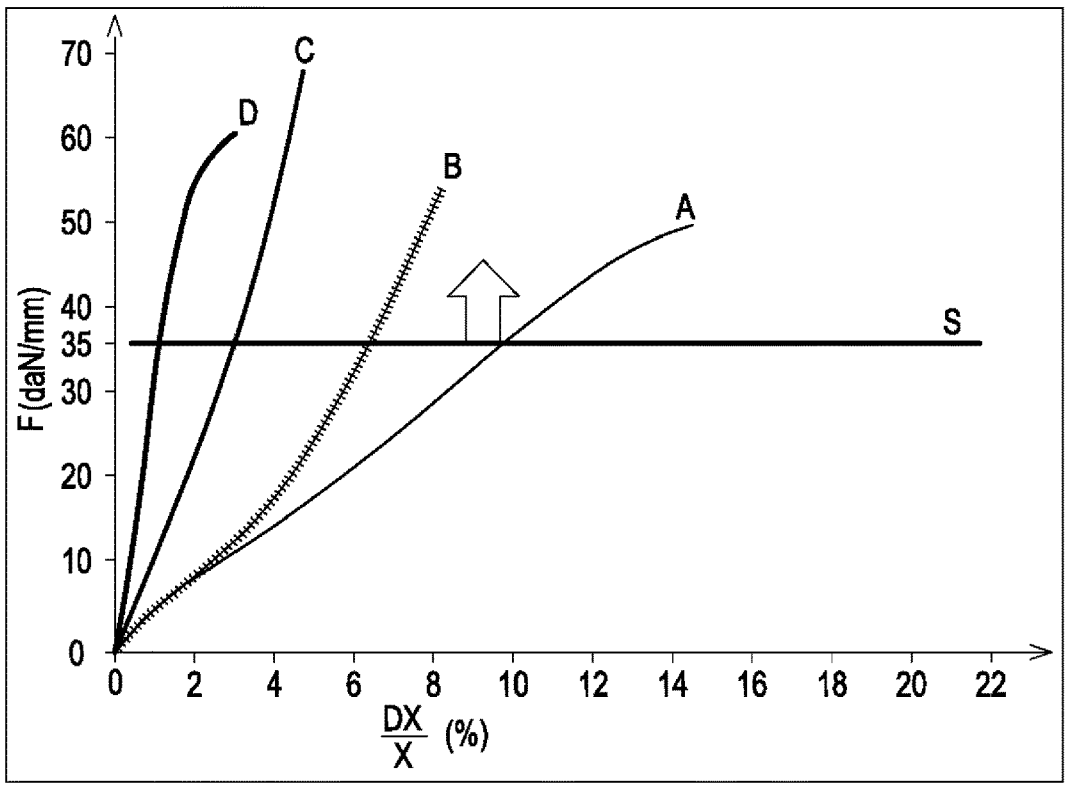

FIG. 3 shows various curves of the tensile behaviour of a hooping layer, showing the variation in the tensile force per mm of axial width of the hooping layer F, expressed in daN/mm, as a function of its deformation in extension DX/X, for various types of hoop reinforcers.

The curves in FIG. 3 were established for a hooping layer of a passenger vehicle tire of size 205/55 R 16, intended to be mounted on a 6.5J16 rim and to be inflated to a nominal pressure of 2.5 bar under "normal load" and 2.9 bar under "extra load", in accordance with the ETRTO (European Tire and Rim Technical Organisation) standard. Curve A is the tensile curve for a hooping layer the hoop reinforcers of which are made up of 2, 144-tex strands (144/2) of PET with a twist of 290 turns per metre (290 tpm), the pitch P of the reinforcers being equal to 0.8 mm Curve B is the tensile curve for a hooping layer the hybrid hoop reinforcers of which are made up of a combination of a 334 tex thread count PET and a 330 tex thread count aramid, twisted together with a balanced twist of 210 turns per metre. Curve C is the tensile curve for a hooping layer the hoop reinforcers of which are made up of 2, 167-tex strands (167/2) of aramid, with a twist of 315 turns per metre (315 tpm), the pitch P of the reinforcers being equal to 0.8 mm Curve D is the tensile curve for a hooping layer the hoop reinforcers of which are made of metal cords made of steel made up of an assembly of 3, 0.26 mm metal threads, the pitch P of the reinforcers being equal to 0.85 mm. The straight line S is the threshold-line corresponding to a force per mm of axial width of hooping layer equal to 35 daN/mm, beyond which the forces at break per mm of axial width of hooping layer FR of the various hooping layers depicted lie.

Figure 4:
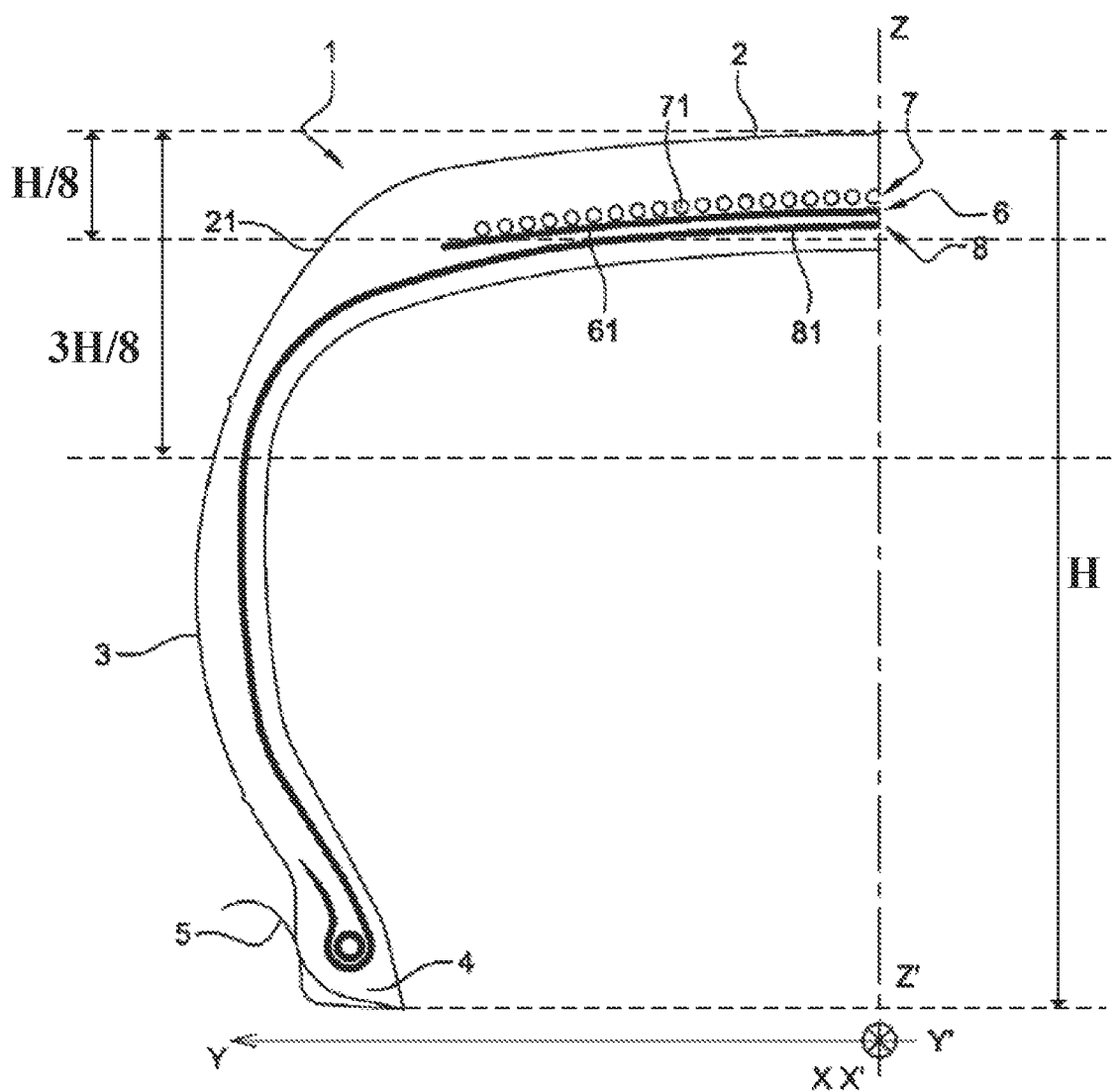

FIG. 4 shows the portion extending radially between axial straight lines positioned respectively at radial distances of 3H/8 and H/8 away from the radially outermost point of the tire tread.

Figure 5:
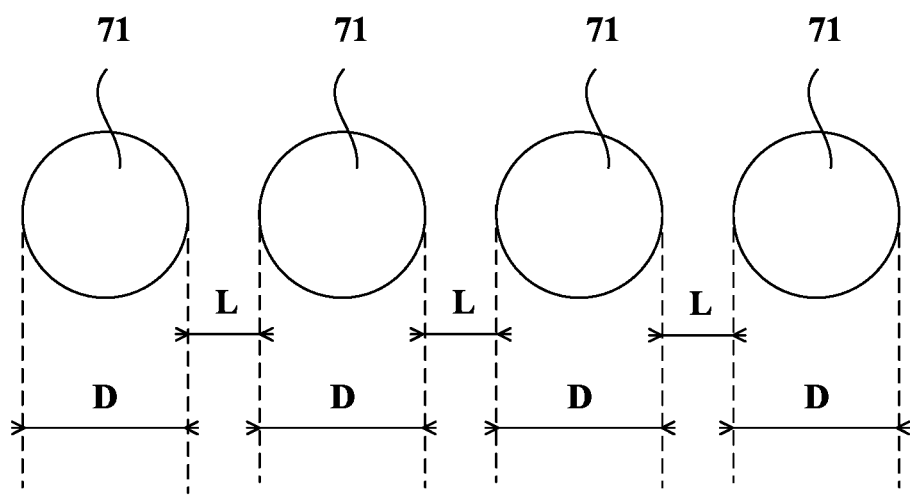

FIG. 5 shows a ratio of the hoop reinforcer diameter D to the hoop reinforcer inter-reinforcer distance L separating two consecutive hoop reinforcers.

The invention was studied more particularly for a passenger vehicle tire of size 205/55 R 16, intended to be mounted on a 6.5J16 rim and to be inflated to a nominal pressure of 2.5 bar under "normal load" and 2.9 bar under "extra load", in accordance with the ETRTO (European Tire and Rim Technical Organisation) standard. A reference tire of the prior art R, a comparative example E that does not fall within the scope of the invention and three alternative forms of embodiment of the invention, V1, V2 and V3, were compared.

Table 1 below shows the characteristics of the hooping layers of comparative example E that does not fall within the scope of the invention and of the three alternative forms of embodiment of the invention V1, V2, V3 for a tire of size 205/55R16:

a twist of 315 turns per metre (315 tpm). The hoop reinforcers of alternative form V2 consist of 3 strands of 440 tex PET (440/3) with a twist of 210 turns per metre (210 tpm). The hoop reinforcers of alternative form V3 are metal cords consisting of 3 steel threads of diameter 0.26 mm assembled in a helix with a pitch of 14 mm.

The inter-reinforcer distance L in the formula D/L is equal to the difference between the pitch P spacing between the reinforcers, measured between the axes of two consecutive reinforcers, and the diameter D of a reinforcer.

It should be noted that, for the four types of hooping layers studied, the secant extension modulus values at 15% of the force at break of the hooping layer FR are equal to 178 daN/mm, for comparative example E, outside the scope of the invention, and respectively to 1052 daN/mm, 471 daN/mm and 1552 daN/mm for alternative forms of embodiment V1, V2 and V3, as compared with the threshold value of 250 daN/mm. The forces at break per mm of axial width of hooping layer FR of the hooping layers of comparative example E and of the alternative forms V1, V2 and V3 are respectively equal to 23 daN/mm, 69 daN/mm, 55 daN/mm, 66 daN/mm, as compared with the threshold value of 35 daN/mm Finally, the ratios D/L between the diameter D of a reinforcer and the inter-reinforcers distance L are respectively equal to 3.4, 5.2, 4.8 and 2.1.

Table 2 below shows the types of reinforcers and the angles, formed by the said reinforcers, for the carcass, working and hoop reinforcements, for a passenger vehicle tire of size 205/55R16, in the case of a reference design of the prior art R, of the comparative example E not falling within the scope of the invention and of the three alternative forms of embodiment of the invention V1, V2, V3:

TABLE 1

Characteristics of the hooping layers in 205/55R16

|  | Hoop reinforcer | Reinforcer Force at break (N) | Reinforcer diameter D (mm) | Reinforcer pitch P (mm) | Ratio D/L | Force at break per mm of axial width of the hooping layer FR (daN/mm) | 15% of FR (daN/mm) | Deformation at 15% of FR (%) | Secant modulus MA at 15% of FR (daN/mm) |
|---|---|---|---|---|---|---|---|---|---|
| Comparative example E | PET 144/2 290 tpm | 185 | 0.63 | 0.8 | 3.4 | 23 | 3.4 | 1.92 | 178 |
| Alternative form V1 | Aramid 167/2 315 tpm | 550 | 0.67 | 0.8 | 5.2 | 69 | 10.3 | 0.98 | 1052 |
| Alternative form V2 | PET 440/3 210 tpm | 820 | 1.24 | 1.5 | 4.8 | 55 | 8.2 | 1.74 | 471 |
| Alternative form V3 | Metal cord 3.26 | 475 | 0.58 | 0.85 | 2.1 | 66 | 8.4 | 0.54 | 1552 |

The hoop reinforcers of comparative example E consist of 2 strands of 144 tex PET (144/2) with a twist of 290 turns per metre (290 tpm). The hoop reinforcers of alternative form V1 consist of 2 strands of 167 tex aramid (167/2) with

TABLE 2

Types and angles of the reinforcers of carcass, working and hoop reinforcements in 205/55R16

|  | Type of carcass reinforcer | Angle $A_{C2}$ in the equatorial plane (°) | Type of working reinforcer | Angle $A_T$ in the equatorial plane (°) | Type of hoop reinforcer | Angle $A_F$ in the equatorial plane (°) |
|---|---|---|---|---|---|---|
| Reference of the prior art R | PET 144/2 290 tpm | 90 | Steel 2.30 P = 1.2 mm | +/−25 | Nylon N140/2 98 f/dm | 0 |
| Comparative example E | PET 144/2 290 tpm | 67 | Steel 2.30 P = 0.9 mm | −40 | PET 144/2 290 tpm | 0 |
| Alternative form V1 | PET 144/2 290 tpm | 67 | Steel 2.30 P = 0.9 mm | −40 | Aramid 167/2 315 tpm | 0 |
| Alternative form V2 | PET 144/2 290 tpm | 67 | Steel 2.30 P = 0.9 mm | −40 | PET 440/3 210 tpm | 0 |

TABLE 2-continued

Types and angles of the reinforcers of carcass, working and hoop reinforcements in 205/55R16

| | Type of carcass reinforcer | Angle $A_{C2}$ in the equatorial plane (°) | Type of working reinforcer | Angle $A_T$ in the equatorial plane (°) | Type of hoop reinforcer | Angle $A_F$ in the equatorial plane (°) |
|---|---|---|---|---|---|---|
| Alternative form V3 | PET 144/2 290 tpm | 67 | Steel 2.30 P = 0.9 mm | −40 | Metal cord 3.26 | 0 |

According to Table 2, the carcass reinforcement, in all configurations, is made up of a single carcass layer the carcass reinforcers of which are made up of 2, 144-tex strands (144/2) of PET with a twist of 290 turns per metre (290 tpm). For the reference of the prior art, the carcass reinforcers of the carcass layer form, with the circumferential direction and in the equatorial plane, an angle $A_{C2}$ equal to 90°. For all the other configurations, the carcass reinforcers of the carcass layer form, with the circumferential direction and in the equatorial plane, an angle $A_{C2}$ equal to 67°.

The working reinforcement, for the reference of the prior art, is made up of two working layers the working reinforcers of which are metal cords made of steel containing 0.7% carbon, made up of 2 threads having a diameter equal to 0.30 mm, and laid at a pitch P equal to 1.2 mm, the said working reinforcers forming, with the circumferential direction, an angle equal to 25° and crossed from one working layer to the next. The working reinforcement, for all the other configurations studied, is made up of a single working layer the working reinforcers of which are metal cords made of steel containing 0.7% carbon, made up of 2 threads having a diameter equal to 0.30 mm, and laid at a pitch P equal to 0.9 mm, the said working reinforcers forming, with the circumferential direction, an angle equal to −40°.

Table 3 hereinbelow presents theoretical results relating to the radial Rxx and shear Gxy stiffnesses, derived from analytical calculations, and theoretical burst pressures for a tire of size 205/55R16:

TABLE 3

Stiffnesses and burst pressures calculated on 205/55R16

| | Radial stiffness Rxx as a relative value (%) | Shear stiffness Gxy as a relative value (%) | Burst pressure as a relative value (%) |
|---|---|---|---|
| Reference of the prior art R | 100 | 100 | 100 |
| Comparative example E | 32 | 11 | 36 |
| Alternative form V1 | 113 | 15 | 110 |
| Alternative form V2 | 80 | 14 | 82 |
| Alternative form V3 | — | — | — |

The radial stiffness Rxx, expressed in daN/mm, is the radial force that needs to be applied to the tire in order to obtain a 1 mm radial displacement of its crown. The shear stiffness Gxy, expressed in daN/mm, is the axial force that needs to be applied to the tire in order to obtain a 1 mm axial displacement of its crown. The theoretical burst pressure of the tire, expressed in bar, is a characteristic of the ability of the tire to withstand pressure. The radial stiffness Rxx and shear stiffness Gxy characteristics, and the burst pressure, are expressed in the form of a relative value with respect to the corresponding characteristics of the prior-art reference R, considered as the base 100.

According to Table 3, the alternative forms V1 and V2 exhibit values of radial stiffness Rxx and of burst pressure which are close to the values obtained for the prior-art reference R. By contrast, the shear stiffnesses Gxy are very much lower than the reference R.

Table 4 hereinbelow shows the results of measurements and tests relating to the various tire designs studied, for a tire of size 205/55 R16:

TABLE 4

Cornering stiffnesses, breaking energy and burst pressures measured on 205/55R16

| | Cornering stiffness as a relative value (%) | Breaking energy (J) for an inflation pressure of 2.2 bar | Burst pressure of the tire inflated with water (bar) |
|---|---|---|---|
| Reference of the prior art R | 100 | >588 J | >16 bar |
| Comparative example E | — | <588 J | <15 bar |
| Alternative form V1 | 110 | >588 J | >16 bar |
| Alternative form V2 | 98 | >588 J | >16 bar |
| Alternative form V3 | 107 | >588 J | >16 bar |

The cornering stiffness Dz of a tire is the axial force applied to the tire in order to generate a 1° rotation of the tire about a radial direction. In Table 4, the cornering stiffness is expressed in the form of a relative value, namely as a percentage of the prior-art reference considered as base 100, for a tire of size 205/55R16, subjected to a load equal to 0.8 times its nominal load, within the meaning of the ETRTO standard, the said nominal load being equal to 4826 N.

The perforation energy or breaking energy is measured by indentation by a cylindrical or polar obstacle having a diameter of 19 mm, the tire being inflated to a pressure equal to 2.2 bar (extraload condition). During the course of this test, the energy is measured at the moment that the polar perforates the crown and is compared against a minimum threshold value. For a tire of this size, the minimum threshold value that is to be respected to meet the so-called "Extraload" requirement of the standard cover is equal to 588 J.

The burst-pressure test on the tire is carried out on a tire inflated with water. The minimum threshold value adapted to guarantee the tire's ability to withstand the pressure with a satisfactory margin of safety is taken as 16 bar.

According to Table 4, in comparison with the results obtained for the reference R, the alternative forms of the invention V1, V2 and V3 exhibit a cornering stiffness Dz at the same level as the reference (between 98% and 110%), a breaking energy value likewise higher than the minimum threshold value of 588 J and a burst pressure higher than the minimum threshold value of 16 bar. These results are obtained for lightened tire structures comprising just one working layer rather than two working layers that are crossed with respect to one another in the case of the reference R. Comparative example E with one hooping layer, but which does not fall within the description of the patent, meets none of the breaking energy and burst pressure criteria. It should be noted that, despite the fact that the alternative forms V1, V2, V3 exhibit a range of calculated stiffnesses that is markedly offset in relation to the reference, the cornering stiffnesses actually measured are close to that of the reference R.

Table 5 hereinbelow presents results of simulations for various tire sizes and various reinforcement designs: cornering stiffness Rxx, shear stiffness Gxy and theoretical burst pressure in terms of relative value in relation to the reference of the prior art in 205/55R16.

TABLE 5 calculated stiffnesses and burst pressures for various sizes of passenger vehicle tire, in terms of relative value in relation to the reference 205/55R16

|   | Dimension | Type of carcass reinforcer | Angle $A_{C2}$ in the equatorial plane (°) | Type of working reinforcer | Angle $A_T$ in the equatorial plane (°) | Type of hoop reinforcer | Radial stiffness Rxx (%) | Shear stiffness Gxy (%) | Burst pressure (%) |
|---|---|---|---|---|---|---|---|---|---|
| R | 205/55R16 (reference) | PET 144/2 290 tpm | 90 | Steel 2.30NF P = 1.2 mm | +/−25 | Nylon N140/2 98 f/dm | 100 | 100 | 100 |
| V1 | 205/55R16 | PET 144/2 290 tpm | 67 | Steel 2.30NF P = 0.9 mm | −40 | Aramid 167/2 315 tpm | 113 | 15 | 110 |
| V11 | 165/80R13 | PET 144/2 290 tpm | 60 | Steel 2.30 P = 0.9 mm | −40 | Aramid 167/2 315 tpm | 113 | 14 | 124 |
| V12 | 245/45R18 | PET 144/2 290 tpm | 69 | Steel 2.30 P = 0.9 mm | −40 | Aramid 167/2 315 tpm | 113 | 15 | 100 |
| V2 | 205/55R16 | PET 144/2 290 tpm | 67 | Steel 2.30 P = 0.9 mm | −40 | PET 440/3 210 tpm | 80 | 14 | 82 |
| V21 | 165/80R13 | PET 144/2 290 tpm | 60 | Steel 2.30 P = 0.9 mm | −40 | PET 440/3 210 tpm | 80 | 14 | 92 |
| V22 | 245/45R18 | PET 144/2 290 tpm | 69 | Steel 2.30 P = 0.9 mm | −40 | PET 440/3 210 tpm | 80 | 14 | 74 |

Table 5 demonstrates that, with respect to the tire of size 205/55R16 described in the preceding paragraphs, the analytical calculations performed on tires of different sizes, such as, for example, on 165/80R13 (alternative forms V11 and V21) and on 245/45R18 (alternative forms V12 and V22), and which have the features of the invention, demonstrate that these offer compromises between radial stiffness Rxx and shear stiffness Gxy which are very similar to those obtained for alternative forms V1 and V2, the measurement results for which are defined in Table 4, these compromises moreover being entirely satisfactory with regard to the reference of the prior art R. It should be noted that the optimal choice of essential characteristics for tires of different sizes, falling within the context of the invention, may vary from one size to another. For example, while for 205/55R16, the optimum angles $A_{C2}$, for the carcass reinforcers in the equatorial plane, and $A_T$, for the working reinforcers, are respectively equal to 67° and −40°, for alternative form V21 in 165/80R13, the optimum angles $A_{C2}$ and $A_T$ are 60° and −40°, and for alternative form V22 in 245/45R18, the optimum angles $A_{C2}$ and $A_T$ are 69° and −40°.

In the field of passenger vehicle tires, the invention is not restricted to the carcass reinforcers and to the working reinforcers described hereinabove. The carcass reinforcers may be made of any type of textile material such as, for example and non-exhaustively, PET, aramid, nylon or any combination of these materials. Working reinforcers are metal cords which may be of various assemblies such as, for example and non-exhaustively, cords of formula 3.26 (assembly of 3 threads, 0.26 mm in diameter), 3.18 (assembly of 3 threads, 0.18 mm in diameter), 2.30 (assembly of 2 threads, 0.30 mm in diameter, with a helix pitch of 14 mm) or mono-filaments 0.40 mm in diameter.

The invention is not restricted to a tire for a passenger vehicle but may be extended, non-exhaustively, to tires intended to be fitted to 2-wheeled vehicles such as motorbikes, vehicles of the heavy duty or construction plant type.

The invention claimed is:

1. A tire for a passenger vehicle, comprising:
   a tread intended to come into contact with the ground and connected, at its axial ends, radially towards the inside, via two sidewalls, to two beads adapted to come into contact with a rim;
   a single working reinforcement, radially on the inside of the tread, and comprising at least one working layer comprising metal working reinforcers coated in an elastomeric material, wherein in each working layer, said working reinforcers of a respective working layer forming, with a circumferential direction of the tire, the same angle $A_T$ at least equal to 10°;
   a hoop reinforcement, radially on the inside of the tread, and radially adjacent to the working reinforcement, and comprising a single hooping layer comprising hoop reinforcers coated in an elastomeric material, said hoop reinforcers forming, with the circumferential direction, the same angle $A_F$ at most equal to 5°;
   a carcass reinforcement, joining the two beads together, radially on the inside of the working reinforcement and of the hoop reinforcement, and comprising at least one carcass layer comprising textile carcass reinforcers coated in an elastomeric material, wherein in each carcass layer, said carcass reinforcers of a respective carcass layer forming, with the circumferential direction, in the sidewalls throughout a portion extending radially between axial straight lines positioned respectively at radial distances of 3H/8 and of H/8 away from the radially outermost point of the tread, the same angle $A_{C1}$ at least equal to 85°;
   wherein the tire comprises a crown reinforcement constituted by the working reinforcement and by the hoop reinforcement; and wherein the hooping layer has a force at break per mm of axial width of the hooping layer FR at least equal to 35 daN/mm, wherein the hooping layer has a secant extension modulus MA at least equal to 250 daN/mm, for an applied force F equal to 15% of the force at break FR of said hooping layer, wherein the working reinforcement comprises a single working layer the working reinforcers of which form, with the circumferential direction, the same angle $A_T$ at least equal to 30° and at most equal to 50°, and wherein in each carcass layer of the carcass reinforcement, the carcass reinforcers of a respective carcass layer form, with the circumferential direction and in the equatorial plane, the same angle $A_{C2}$ at least equal to 55° and at most equal to 80° and having an orientation the opposite of that of the angle $A_T$ of the working reinforcers so that the carcass reinforcers, the hooping reinforcers, and the working reinforcers constitute a triangulation.

2. The tire according to claim 1, wherein the hooping layer has a force at break per mm of axial width of the hopping layer FR at least equal to 45 daN/mm.

3. The tire according to claim 1, wherein the hooping layer has a secant extension modulus MA at least equal to 300 daN/mm, for an applied force F equal to 15% of the force at break FR of said hooping layer.

4. The tire according to claim 1, wherein the hooping layer has a secant extension modulus MA at most equal to 1800 daN/mm, for an applied force F equal to 15% of the force at break FR of said hooping layer.

5. The tire according to claim 1, wherein the hooping layer has a secant extension modulus MA at most equal to 1600 daN/mm, for an applied force F equal to 15% of the force at break FR of said hooping layer.

6. The tire according to claim 1, wherein the hoop reinforcers have a diameter D and are spaced one from the next by an inter-reinforcer distance L, wherein the ratio D/L between the diameter D of each hoop reinforcer and the distance L separating two consecutive hoop reinforcers is at least equal to 1 and at most equal to 8.

7. The tire according to claim 1, wherein the hoop reinforcers have a diameter D and are spaced one from the next by an inter-reinforcer distance L, wherein the ratio D/L between the diameter D of each hoop reinforcer and the distance L separating two consecutive hoop reinforcers is at least equal to 2 and at most equal to 5.

8. The tire according to claim 1, wherein the hoop reinforcers are textile material hoop reinforcers and the textile material is aromatic polyamide, aliphatic polyamide, polyester, polyketone or cellulose.

9. The tire according to claim 1, wherein the hoop reinforcers are hybrid hoop reinforcers which comprise a combination of at least two distinct textile materials.

10. The tire according to claim 1, wherein the hoop reinforcers are metallic material hoop reinforcers.

11. The tire according to claim 1, wherein the working reinforcers of the working layer form, with the circumferential direction, an angle $A_T$ within a range of 35° to 45°.

12. The tire according to claim 1, wherein the carcass reinforcers of the at least one carcass layer form, with the circumferential direction and in the equatorial plane, an angle $A_{C2}$ within a range of 60° to 70°.

* * * * *